(12) United States Patent
Ni et al.

(10) Patent No.: US 11,474,805 B2
(45) Date of Patent: Oct. 18, 2022

(54) SYSTEM CAPABLE OF UPGRADING FIRMWARE IN BACKGROUND AND METHOD FOR UPGRADING FIRMWARE IN BACKGROUND

(71) Applicant: REALTEK SEMICONDUCTOR CORP., Hsinchu (TW)

(72) Inventors: Wen-Juan Ni, Suzhou (CN); Hao Zhou, Suzhou (CN); Yue-Cheng Zhao, Suzhou (CN); Rong Chen, Suzhou (CN)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 168 days.

(21) Appl. No.: 17/109,268

(22) Filed: Dec. 2, 2020

(65) Prior Publication Data
US 2021/0279048 A1    Sep. 9, 2021

(30) Foreign Application Priority Data
Mar. 9, 2020    (CN) .......................... 202010156457.7

(51) Int. Cl.
*G06F 8/65* (2018.01)
*G06F 9/30* (2018.01)
*G06F 9/48* (2006.01)
*G06F 9/4401* (2018.01)

(52) U.S. Cl.
CPC ............ *G06F 8/65* (2013.01); *G06F 9/30189* (2013.01); *G06F 9/4411* (2013.01); *G06F 9/4881* (2013.01)

(58) Field of Classification Search
CPC ..... G06F 8/61; G06F 8/63; G06F 8/65; G06F 8/658; G06F 9/4401; G06F 9/4406; G06F 9/4408
See application file for complete search history.

(56) References Cited

U.S. PATENT DOCUMENTS

| | | | |
|---|---|---|---|
| 7,480,904 B2 | 1/2009 | Hsu et al. | |
| 2009/0222650 A1* | 9/2009 | Chen | G06F 9/4401 713/1 |
| 2010/0169709 A1 | 7/2010 | Chiu et al. | |
| 2011/0302572 A1* | 12/2011 | Kuncoro | G06F 8/66 711/E12.008 |
| 2013/0007724 A1 | 1/2013 | Lai et al. | |
| 2019/0087174 A1* | 3/2019 | Lappi | G06F 8/654 |

FOREIGN PATENT DOCUMENTS

| TW | 200611189 A | 4/2006 |
|---|---|---|
| TW | 201025008 A1 | 7/2010 |
| TW | 201301133 A1 | 1/2013 |

* cited by examiner

*Primary Examiner* — Duy Khuong T Nguyen
(74) *Attorney, Agent, or Firm* — Li & Cai Intellectual Property (USA) Office

(57) ABSTRACT

A system capable of upgrading a firmware in the background and a method for upgrading a firmware in the background are provided. The method for upgrading the firmware in the background partitions the memory module of an electronic device, one user code sector is used to normally execute an initial firmware and an upgrade flow, and the other user code sector is used to store an upgrade firmware.

20 Claims, 7 Drawing Sheets

SYSTEM CAPABLE OF UPGRADING FIRMWARE IN BACKGROUND AND METHOD FOR UPGRADING FIRMWARE IN BACKGROUND

CROSS-REFERENCE TO RELATED PATENT APPLICATION

This application claims the benefit of priority to China Patent Application No. 202010156457.7, filed on Mar. 9, 2020 in People's Republic of China. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a system and method, and more particularly to a system capable of upgrading a firmware in the background and a method for upgrading the firmware in the background.

BACKGROUND OF THE DISCLOSURE

Firmware refers to a device "driver" stored in the device, and is the most basic and lowest-level software of a system and is often referred to as the "soul" of the device. The firmware upgrade can be used to solve defects and compatibility problems of the product device, and can be used to improve performance of the product device and add the latest features thereto. In order to meet the changing needs of users, the firmware upgrade of the product device is essential.

In existing firmware upgrade methods, when the firmware upgrade is completed, the firmware system needs to be reset before resuming work, and once an abnormality (such as power failure) occurs during the upgrade process, the device will not be able to work normally, thereby reducing the stability and reliability of the firmware upgrade. In addition, the function of the device may not work properly during the upgrade process of the firmware.

Therefore, there is an urgent need for a firmware upgrade system and method that can complete the firmware upgrade during a normal operation of the device and can provide continuous services during the firmware upgrade.

SUMMARY OF THE DISCLOSURE

In response to the above-referenced technical inadequacies, the present disclosure provides a system capable of upgrading a firmware in the background and a method for upgrading the firmware in the background for a liquid crystal display or a converter device, the system and the method can complete the firmware upgrade during a normal operation of the device mentioned above and can provide continuous services during the firmware upgrade, thereby improving the reliability and stability of the firmware upgrade, while providing better user experience.

In one aspect, the present disclosure provides a method for upgrading firmware in the background applicable to an electronic device including a processing unit and a memory module, and the background firmware upgrade method includes: configuring the processing unit of the electronic device to execute a boot process, the memory module includes a boot sector, a first user code sector, a second user code sector, and a flag sector, the boot sector stores the boot process, each of the first user code sector and the second user code sector stores an initial firmware, and the flag sector stores a plurality of upgrade auxiliary variables, and the boot process includes: importing the initial firmware into the boot sector; determining the first user code sector and the second user code sector as a firmware operating sector and a firmware backup sector, respectively, according to an execution priority of the plurality of upgrade auxiliary variables; and selecting the initial firmware of the firmware operating sector to execute a firmware main process; configuring a host connected to the electronic device to execute an upgrade process associated with an upgrade firmware, wherein the firmware main process and the upgrade process are cooperated to perform an upgrade flow, which includes: configuring the host to obtain a firmware version of the initial firmware from the electronic device, and determine whether the firmware version is smaller than a version of the upgrade firmware; configuring the host to, in response to the firmware version being less than the version of the upgrade firmware, send a background firmware upgrade request to the electronic device; configuring the processing unit to return an upgrade request result according to an operation state of the electronic device, wherein the upgrade request result is used to indicate that the electronic device is in an idle state or a busy state; configuring the processing unit to, in response to the upgrade request result indicating that the electronic device is in the idle state, determine whether the electronic device is in a system idle state; configuring the processing unit to, in response to the processing unit determining that the electronic device is in the system idle state, detect the execution priority to determine how the first user code sector and the second user code sector are allocated to the firmware operating sector and the firmware backup sector, and set the firmware backup sector as a current upgrade sector; configuring the host to send a firmware data write request to the electronic device to configure the processing unit to perform an erasing operation on the current upgrade sector and write data of the upgrade firmware into the current upgrade sector; and configuring the processing unit to, in response to the data of the upgrade firmware being written, return an operation result indicating a successful upgrade operation; in response to the electronic device being restarted, configuring the processing unit to execute the boot process to determine which of the first user code sector and the second user code sector has been upgraded, and modify the execution priority accordingly; and configuring the processing unit to execute another firmware main process by selecting the upgraded initial firmware in the firmware operating sector according to the modified execution priority.

In another aspect, the present disclosure provides a system capable of upgrading a firmware in the background. The system includes an electronic device and a host. The electronic device includes a processing unit and a memory module. The memory module includes a boot sector, a first user code sector, a second user code sector, and a flag sector. The boot sector stores a boot process, each of the first user code sector and the second user code sector stores an initial firmware, and the flag sector stores a plurality of upgrade auxiliary variables. The host is configured to execute an upgrade process associated with an upgrade firmware. The processing unit is configured to execute the boot process, which includes: importing the initial firmware into the boot sector; determining the first user code sector and the second user code sector as a firmware operating sector and a firmware backup sector, respectively, according to an execution priority of the plurality of upgrade auxiliary variables; and selecting the initial firmware of the firmware operating sector to execute a firmware main process. The firmware main process and the upgrade process are cooperated to perform an upgrade flow, which includes: configuring the host to obtain a firmware version of the initial firmware from the electronic device, and determine whether the firmware version is smaller than a version of the upgrade firmware; configuring the host to, in response to the firmware version being less than the version of the upgrade firmware, send a background firmware upgrade request to the electronic device; configuring the processing unit to return an upgrade request result according to an operation state of the electronic device, wherein the upgrade request result is used to indicate that the electronic device is in an idle state or a busy state; configuring the processing unit to, in response to the upgrade request result indicating that the electronic device is in the idle state, determine whether the electronic device is in a system idle state; configuring the processing unit to, in response to the processing unit determining that the electronic device is in the system idle state, detect the execution priority to determine how the first user code sector and the second user code sector are allocated to the firmware operating sector and the firmware backup sector, and set the firmware backup sector as a current upgrade sector; configuring the host to send a firmware data write request to the electronic device to configure the processing unit to perform an erasing operation on the current upgrade sector and write data of the upgrade firmware into the current upgrade sector; and configuring the processing unit to, in response to data of the upgrade firmware being written, return an operation result indicating a successful upgrade operation. In response to the electronic device being restarted, the processing unit is configured to execute the boot process to determine which of the first user code sector and the second user code sector is upgraded, and modify the execution priority accordingly. The processing unit is configured to execute another firmware main process by selecting the upgraded initial firmware in the firmware operating sector according to the modified execution priority.

In conclusion, the system capable of upgrading a firmware in background and the method for upgrading the firmware in background provided by the present disclosure can divide the memory module of an electronic device, one user code sector is used to normally perform firmware and upgrade processes, and the other user code sector is used to store the upgrade firmware to avoid affecting the initial firmware when writing to the memory module during the upgrade process. In addition, it is not necessary to suspend various operations of the electronic device during the upgrade process, and the upgrade can be completed during the normal operation of the electronic device.

Furthermore, during the upgrade process, reliability of the firmware upgrade data is checked, and during implementations of the above processes, as long as the memory module works normally, even if the firmware upgrade fails, the electronic device will still work properly.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
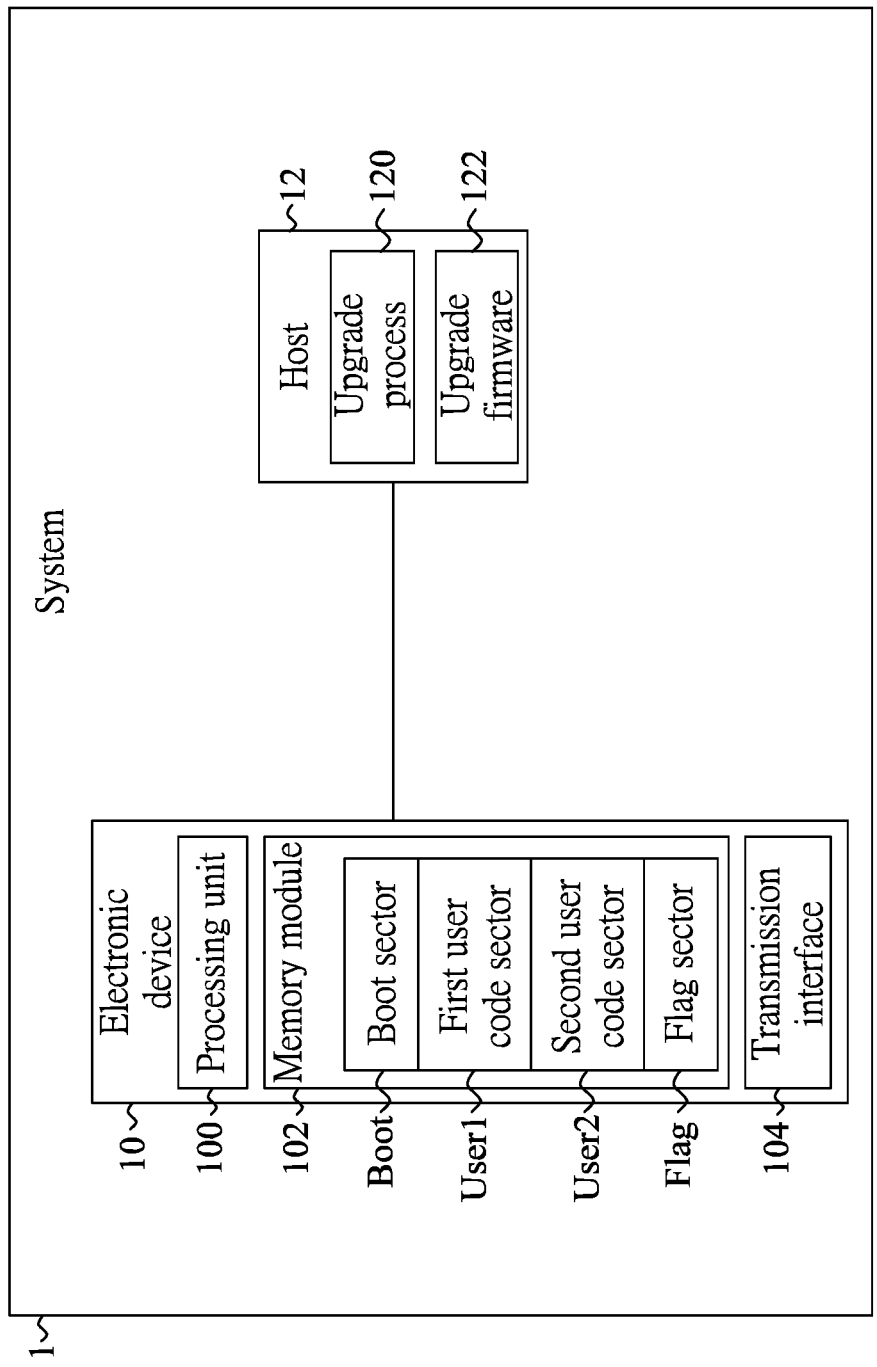
FIG. 1 is a block diagram of a system capable of upgrading a firmware in a background according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Reference is made to FIG. 1, which is a block diagram of a system capable of upgrading a firmware in the background according to an embodiment of the present disclosure. As shown in FIG. 1, an embodiment of the present disclosure provides a system 1 capable of upgrading a firmware in the background, which includes an electronic device 10 and a host 12.

The electronic device 10 includes a processing unit 100 and a memory module 102. The memory module 102 is mainly used for storing firmware, and includes a boot sector Boot, a first user code sector User1, a second user code sector User2, and a flag sector Flag. In some embodiments, the electronic device 10 may be, for example, a liquid crystal display or a converter device.

On the other hand, the host 12 is configured to execute an upgrade process 120 associated with the upgrade firmware 122. In some embodiments, the host 12 may be, for example, a personal computer, and may be electrically connected to and communicate with the electronic device 10 through a transmission interface 104 of the electronic device 10. In addition, in certain embodiments, the upgrade firmware 122 may be stored in the host 12, and the upgrade firmware 122 may include a cyclic redundancy check (CRC) value. In detail, whether on the host 12 or the electronic device 10, when generating a new firmware file, a position of the last byte in the firmware file can be reserved through a code table (for example, by filling value 0xFF) to fill in the CRC value of the entire firmware file. After the new firmware file is generated, for example, a CRC can be performed using a generator polynomial $X8+X2+X+1$ to generate a one-byte CRC value and write it to the last byte of the firmware file.

Figure 2:
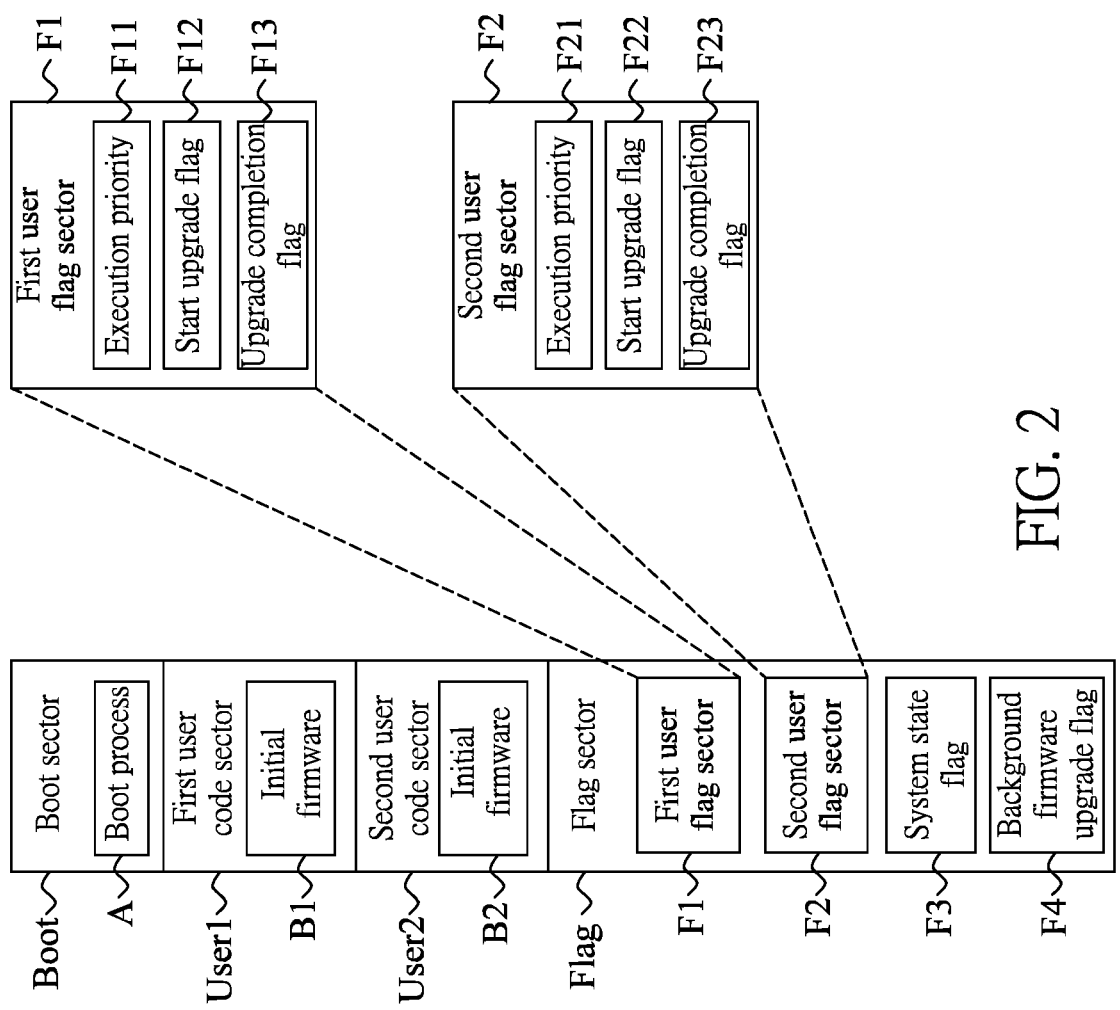
FIG. 2 is a schematic configuration diagram of a memory module according to an embodiment of the present disclosure.

Reference is made to FIG. 2, which is a schematic configuration diagram of a memory module according to an embodiment of the present disclosure. As shown in FIG. 2, the boot sector Boot stores a boot process A, and the first user code sector User1 and the second user code sector User2 each store initial firmware B1 and B2, one of the first user code sector User1 and the second user code sector User2 is used as a firmware operating sector for storing normally operating firmware file, and the other is used as a firmware backup sector for backup and waiting for firmware upgrade.

Next, the flag sector Flag is used to store a plurality of upgrade auxiliary variables. In particular, the flag sector Flag may further include a first user flag sector F1 and a second user flag sector F2, which respectively store the upgrade auxiliary variables corresponding to the first user code sector User1 and the second user code sector User2. For example, the first user flag sector F1 may store an execution priority F11, an upgrade start flag F12, and an upgrade completion flag F13 corresponding to the first user code sector User1, and the second user flag sector F2 may store an execution priority F21, an upgrade start flag F22, and an upgrade completion flag F23 corresponding to the second user code sector User2. The execution priorities F11 and F21 can be named RunPriority, the upgrade start flags F12 and F22 can be named StartFlag to indicate the start of the upgrade, and the upgrade completion flags F13 and F23 can be named DoneFlag to indicate the end of the upgrade.

In some embodiments, values in the execution priorities F11 and F21 may determine the current firmware operating sector and the firmware backup sector. For example, when the value of the execution priority F11 corresponding to the first user code sector User1 is greater than the value of the execution priority F21 corresponding to the second user code sector User2, the first user code sector User1 is the current firmware operating sector, and the second user code sector User2 is the firmware backup sector. When the value of the execution priority F11 corresponding to the first user code sector User1 is smaller than the value of the execution priority F21 corresponding to the second user code sector User2, the first user code sector User1 is the firmware backup sector, and the second user code sector User2 is the current firmware operating sector. In general, storage space of the first user code sector User1 and the second user code sector User2 are the same.

Figure 3:
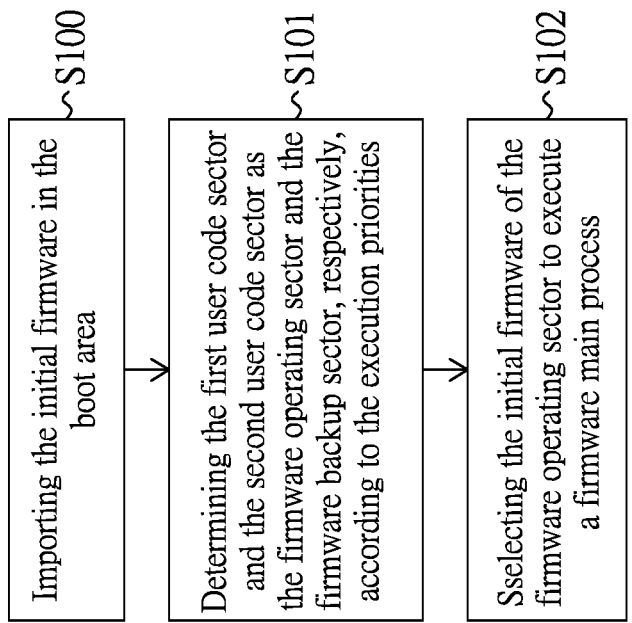
FIG. 3 is a flowchart of a boot process according to an embodiment of the present disclosure.

Reference is made to FIG. 3, which is a flowchart of a boot process according to an embodiment of the present disclosure. As shown in FIG. 3, the processing unit 100 is configured to execute the boot process A, which includes the following steps:

Step S100: importing the initial firmware B1 or B2 in the boot sector.

Step S101: determining the first user code sector User1 and the second user code sector User2 as the firmware operating sector and the firmware backup sector, respectively, according to the execution priorities F11 and F21.

Step S102: selecting the initial firmware of the firmware operating sector to execute a firmware main process.

Figure 4:
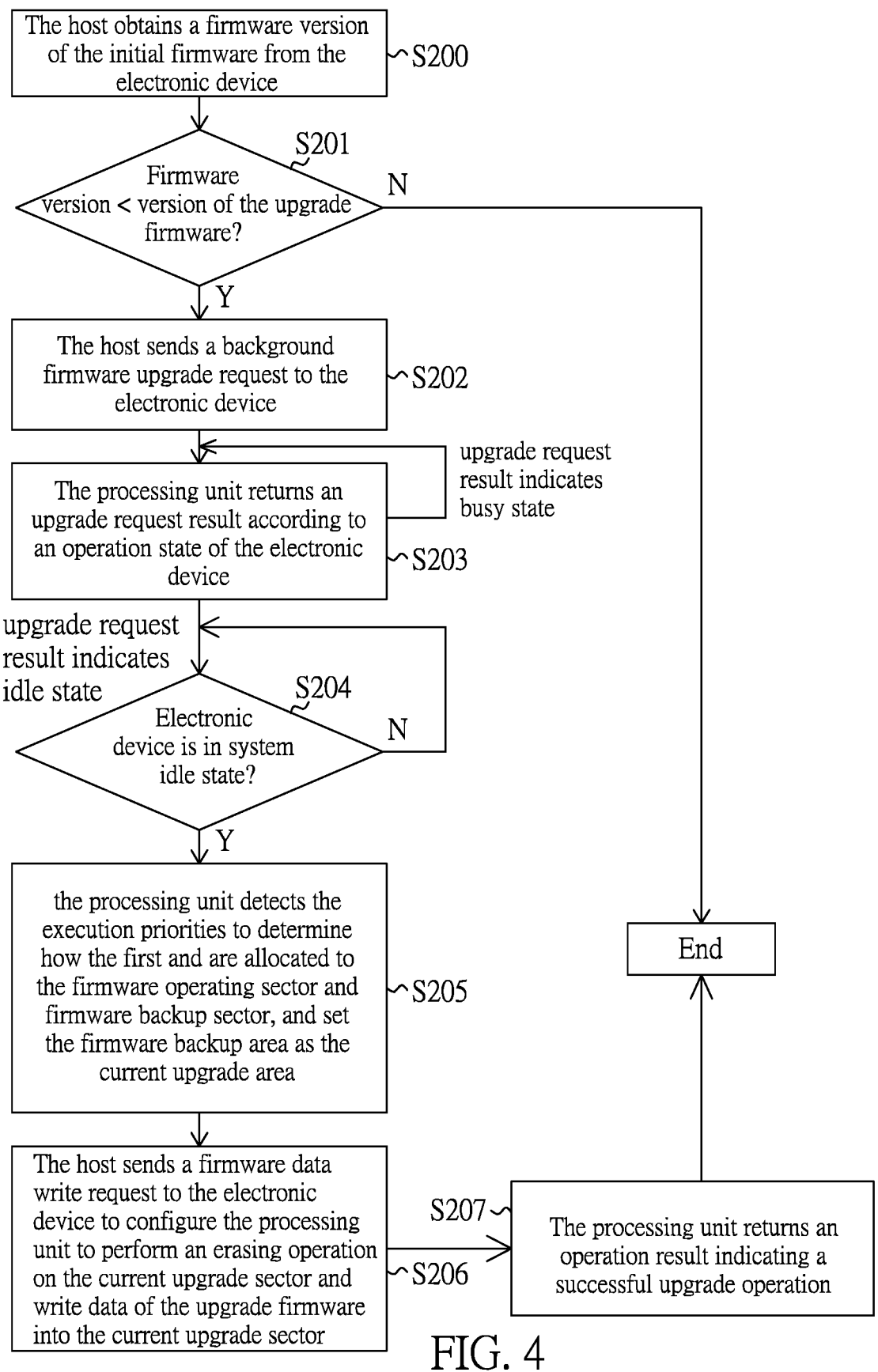
FIG. 4 is a flowchart of a firmware upgrade flow according to an embodiment of the present disclosure.

Reference is further made to FIG. 4, which is a flowchart of a firmware upgrade flow according to an embodiment of the present disclosure. In the present disclosure, the firmware main process and the upgrade process must be cooperated to execute an upgrade flow. As shown in FIG. 4, the upgrade flow includes the following steps:

Step S200: configuring the host 12 to obtain a firmware version of the initial firmware B1 or B2 from the electronic device 10.

Step S201: configuring the host 12 to determine whether the firmware version is smaller than a version of the upgrade firmware 122. In response to the firmware version of the initial firmware B1 or B2 being less than the version of the upgrade firmware 122, the upgrade flow proceeds to step S202: configuring the host 12 to send a background firmware upgrade request to the electronic device 10. In response to the firmware version of the initial firmware B1 or B2 being larger than the version of the upgrade firmware 122, and the upgrade flow then ends.

In the present step, the host 12 may obtain an upgrade request result through the transmission interface 104 of the electronic device 10, and the transmission interface 104 can be, for example, an $I^2C$ interface, but the present disclosure is not limited thereto. Specifically, in the present step, the host 12 may first send a current firmware version acquire request to the electronic device 10 through the transmission interface 104, the processing unit 100 returns the firmware version of the initial firmware B1 or B2, and the host 12 further determines whether the firmware version is less than the version of the upgrade firmware. In response to the firmware version being less than the version of the upgrade firmware 122, the host 12 sends the above-mentioned background firmware upgrade request to the electronic device 10 through the transmission interface 104.

Step S203: configuring the processing unit 100 to return an upgrade request result according to an operation state of the electronic device 10. Here, the upgrade request result is used to indicate that the electronic device 10 is in an idle state or a busy state.

For example, the upgrade request result may be, for example, a state value with one byte. There are three definitions of this status value: 0xBB, 0x11, and 0x12. 0xBB can be used to indicate that the system of the electronic device 10 is in the busy state and cannot process any requests. 0x11 can be used to indicate that the system of the electronic device 10 is in the idle state and the operation is successful. 0x12 can be used to indicate that the system of the electronic device 10 is in the idle state, but the operation is failed.

In response to the upgrade request result indicating that the electronic device 10 is in the busy state, the upgrade flow repeats this step until the upgrade request result indicates that the electronic device 10 is in the idle state, and the upgrade flow proceeds to step S204. For example, when the requested state value read by the upgrade process is 0xBB, the state value of the electronic device 10 is continuously read until the upgrade request result is 0x11, 0x12, or a predetermined response time is reached. If the final requested state value is 0x12 or a time of TimeOut arrives, it indicates that the request failed, and the upgrade process is ended and awaits the next upgrade. If the state value is 0x11, the request is successful.

Figure 5:
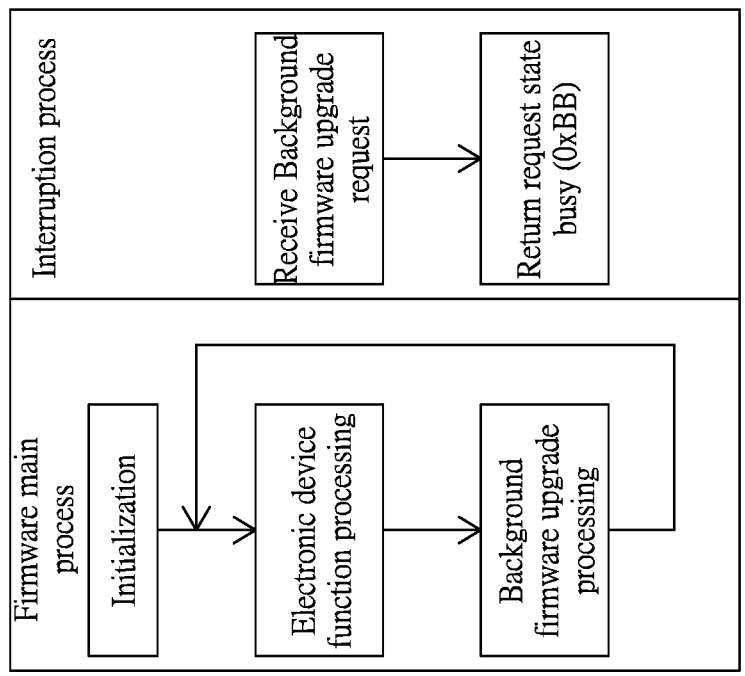
FIG. 5 is a process flowchart of a firmware main process and an interrupt process according to an embodiment of the present disclosure.

In some embodiments, the processor 100 of the electronic device 10 can be configured to further execute an interrupt process and operate in cooperation with the firmware main process to achieve the above steps. Reference is made to FIG. 5, which is a process flowchart of a firmware main process and an interrupt process according to an embodiment of the present disclosure. As shown in FIG. 5, the firmware main process basically performs function processing of the electronic device 10 first, and then performs background firmware upgrade processing. When the firmware main process performs the function processing of the electronic device 10, if the interrupt process receives the background firmware upgrade request from the host 12, the upgrade request result is returned to indicate that the electronic device 10 is in the busy state. The upgrade request result can be the above-mentioned 0xBB used to indicate that the request state value is the busy state.

In response to the upgrade request result indicating that the electronic device 10 is in the idle state, the upgrade flow proceeds to step S204: configuring the process unit 100 to determine whether the electronic device 10 is in the system idle state.

In detail, this step is mainly to detect whether the system of the electronic device 10 is currently in the busy state. The reason is that, during the firmware upgrade process, blocks of the memory module 102 are erased and written, and during these operations, the memory module 102 cannot operate. This step is specifically designed to avoid functions of the electronic device 10 being affected during the firmware upgrade flow since the memory module 102 cannot operate.

As shown in FIG. 2, a system state flag F3 is also set in the flag sector Flag. In this step, the processing unit 100 can further detect the system state flag F3 to determine whether the electronic device 10 is in the system idle state. If the system status flag F3 indicates that the electronic device 10 is in the system idle state, the firmware upgrade request is executed, otherwise the firmware upgrade request is set as pending and waiting for the next processing.

Here, the system state flag F3 includes a plurality of sub-state flags corresponding to a plurality of function instruction pointers (IP). These function instruction pointers correspond to functions need to be responded to and processed by the initial firmware B1 or B2 when the erasing of the blocks of the memory module 102 is performed. The system state flag F3 indicates that the electronic device 10 is in the system idle state only when all the sub-state flags indicate that the plurality of function instruction pointers are idle, otherwise, the system state flag F3 indicates that the electronic device 10 is in the system busy state.

In some embodiments, when the function instruction indicator sets the sub-state flag to busy, the required processing time (this processing time can be used as a limited time) will be simultaneously notified, until the execution of all the function that require the initial firmware B1 or B2 to respond to and process are completed, the sub-state flags are set to idle, or the sub-state flags are automatically set to idle when the limited time is reached, and the system state flag F3 then indicates that the electronic device 10 is in the system idle state.

In response to the processing unit 100 determining that the electronic device 10 is in the system idle state, the upgrade flow proceeds to step S205: configuring the processing unit 100 to detect the execution priorities F11 and F21 to determine how the first user code sector User1 and the second user code sector User2 are allocated to the firmware operating sector and firmware backup sector, and set the firmware backup sector as the current upgrade sector.

In detail, when the system state flag F3 indicates that the electronic device 10 is in the system idle state, as shown in FIG. 2, the processing unit 100 can modify the state value of a background firmware upgrade flag F4 to indicate that the background firmware upgrade function is turned on. During the firmware upgrade process, if the system restarts after a power failure, and the upgrade process does not acknowledge that the electronic device 10 has restarted, the upgrade process may continuously send other upgrade requests. At this time, for other upgrade requests, the state value of the background firmware upgrade flag F4 is determined first. If the background firmware upgrade flag F4 indicates that the background firmware upgrade function is not turned on, which represents that the background firmware upgrade has not been performed, and the other upgrade requests sent at this time can be known to be wrong. In this embodiment, the background firmware upgrade flag F4 will be restored to an initial value after the system restarts, that is, the background firmware upgrade function is not turned on, thereby allowing the upgrade process to determine whether the electronic device 10 has been restarted. However, values of other flags can be maintained after the system restarts.

In this step, if the current firmware operating sector is the first user code sector User1, the second user code sector User2 currently serving as the firmware backup sector is set as the current upgrade sector, and vice versa.

In addition, in response to the processing unit 100 setting the firmware backup sector as the current upgrade sector, the processing unit 100 accordingly modifies the upgrade start flag F12 or F22 of the upgrade auxiliary variables corresponding to the user flag sector of the firmware backup sector as indicating an upgrade start state. For example, at this time, the current upgrade sector is assumed to be the second user code sector User2, and state values of the upgrade start flag F22 and the upgrade completion flag F23 of the second user flag sector F2 are cleared, and the start upgrade flag F22 is modified as indicating the upgrade start state (such as True), and the operation result is returned to the upgrade process.

Step S206: configuring the host 12 to send a firmware data write request to the electronic device 10 to configure the processing unit 100 to perform an erasing operation on the current upgrade sector and write data of the upgrade firmware into the current upgrade sector.

In detail, in the present step, in response to the upgrade process receiving the operation result showing that the electronic device 10 has modified the upgrade start flag F22 as indicating the upgrade start state, the host 10 is configured to further divide data of the upgrade firmware 122 into multiple records of data to be attached to the firmware data write request, and send the firmware data write request to the electronic device 10 for multiple times.

Similarly, the interruption process mentioned above can assist in determining that the electronic device 10 is in the idle state or the busy state at this time, and return the corresponding request state value of the electronic device 10. If the electronic device 10 is in the busy state, the electronic device 10 waits for the firmware main process to perform functional processing, and then writes the data of the upgrade firmware 122 in response to the firmware data write request.

In response to the electronic device 10 receiving the firmware data write request, the processing unit 100 is further configured to determine whether the current upgrade sector has the erasing operation performed thereon before the processing unit 100 is configured to perform the erasing operation on the current upgrade sector.

In detail, the current upgrade sector can be divided into multiple blocks, and variables can be used to indicate Bank and Sector locations of the blocks that were erased last time. For example, two bytes can be used as the variable, a high byte represents a code of the erased bank, the low byte represents a code of the sector, and the initial value is 0xFFFF. The current bank and the current sector in which the currently written data are calculated according to the position of the memory module 102 to which data is currently written, and are compared with the bank and sector that were erased last time. If the current bank is the same as the bank that was last erased, and the current sector is the same as the sector that was last erased, then the sector has already been erased, and no further erasing operation is required. Otherwise, the current bank and the current sector need to be erased.

If the processing unit 100 determines that the current upgrade sector has been erased, the data of the upgrade firmware 122 is written directly into the current upgrade sector, otherwise the current upgrade sector is erased according to the original instructions, and then the data of the upgrade firmware 122 is written into the current upgrade sector. As described previously, the host 12 divides the data of the upgrade firmware 122 into the multiple records of data to be attached to the firmware data write request, and send the firmware data write request to the electronic device 10 for multiple times.

For example, each of the firmware data write request may include 32 byte data of the upgrade firmware 122, and in response to each of the firmware data write request, the processing unit 100 writes the multiple records of data into multiple storage sectors of the current upgrade sector, each time one record of the data is written into one of the storage sectors, the written data is read and a CRC operation is performed to compare the written data to confirm correctness of the written data.

In detail, performing the CRC operation represents performing cyclic redundancy check on the data written to the memory module 102 and a CRC value of the written data (initial value is 0) using a generator polynomial $X^8+X^2+X+1$ to calculate a new CRC value. It should be noted that when the last record of the written data is checked, the last byte of the written data needs to be recorded into a global variable (can be referred to as FileCRC), and then a value of this byte is replaced with 0xFF to calculate the CRC value. If the CRC comparison is inconsistent, the electronic device 10 returns the upgrade process with an operation result indicating that the operation is failed.

Step S207: configuring the processing unit 100 to, in response to the data of the upgrade firmware 122 being written, return an operation result indicating a successful upgrade operation.

In this step, the upgrade process determines the received operation result, and in response to the operation result indicating the successful upgrade operation, the host 12 sends an end background update request to the electronic device 10.

Figure 6:
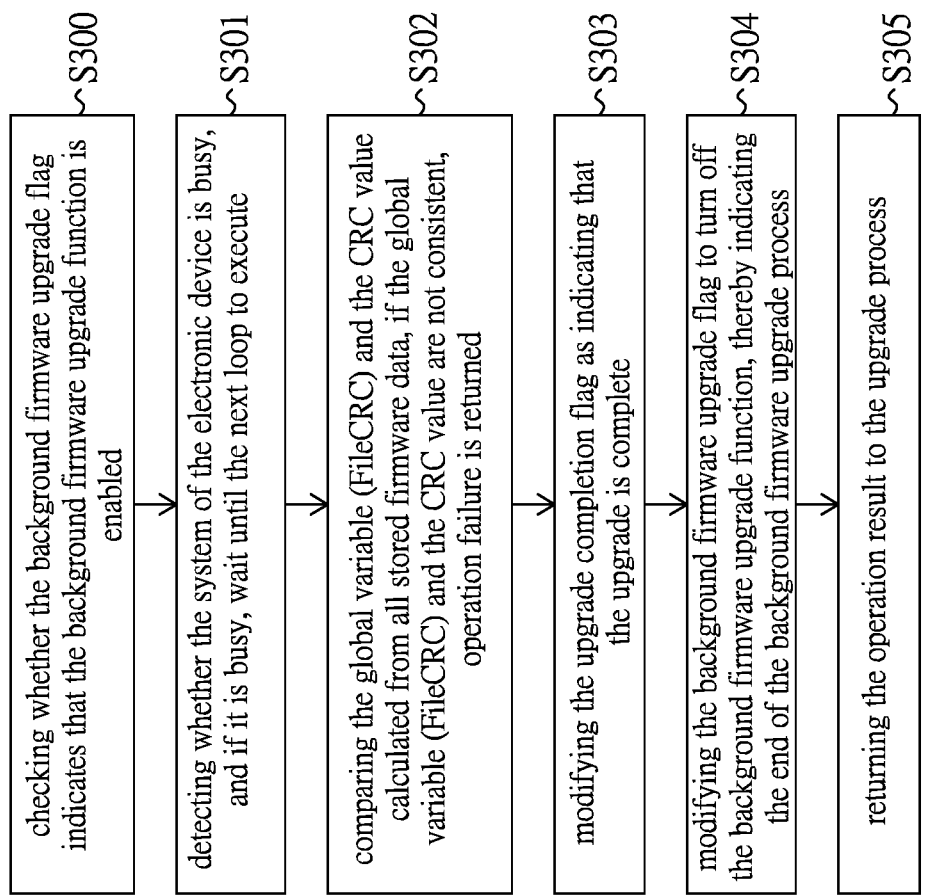
FIG. 6 is another flowchart of an upgrade flow according to an embodiment of the present disclosure.

Reference can be further made to FIG. 6, which is another flowchart of an upgrade flow according to an embodiment of the present disclosure. When the firmware main process receives the end background update request, the electronic device 10 performs the following operations:

Step S300: checking whether the background firmware upgrade flag F4 indicates that the background firmware upgrade function is enabled. If not, a request failure is returned.

Step S301: detecting whether the system of the electronic device 10 is busy, and if it is busy, wait until the next loop to execute.

Step S302: comparing the global variable (FileCRC) and the CRC value calculated from all stored firmware data, if the global variable (FileCRC) and the CRC value are not consistent, operation failure is returned.

Step S303: modifying the upgrade completion flag F13 or F23 as indicating that the upgrade is complete.

Step S304: modifying the background firmware upgrade flag F4 to turn off the background firmware upgrade function, thereby indicating the end of the background firmware upgrade process.

Step S305: returning the operation result to the upgrade process.

Thus, the upgrade process comes to an end.

Figure 7:
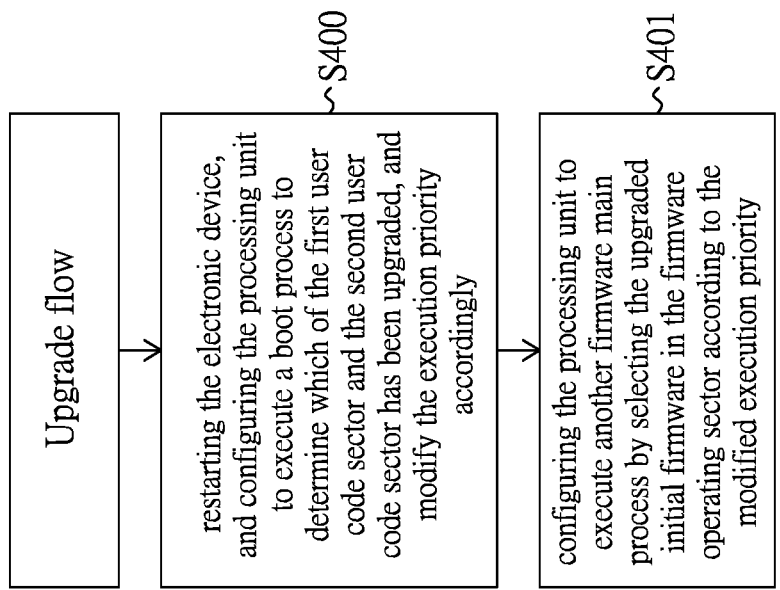
FIG. 7 is a flowchart of a method for upgrading the firmware in background according to an embodiment of the present disclosure.

After the upgrade process is completed, reference is further made to FIG. 7, which is a flowchart of a method for upgrading the firmware in background according to an embodiment of the present disclosure, and the following flow is further performed:

Step S400: restarting the electronic device, and configuring the processing unit to execute a boot process to determine which of the first user code sector and the second user code sector has been upgraded, and modify the execution priority accordingly.

Step S401: configuring the processing unit to execute another firmware main process by selecting the upgraded initial firmware in the firmware operating sector according to the modified execution priority.

After the background firmware upgrade is successful and the electronic device 10 restarts, the boot process will determine which of the first user code sector User1 and the second user code sector User2 has been upgraded according to the state values of the start upgrade flag F12 or F22 and the upgrade completion flag F13 or F23, then modify the state value of execution priority F11 or F21, and turn to the user code sector of the updated firmware to execute the firmware data, and the original firmware operating sector is changed to the firmware backup sector. Therefore, functions of the electronic device 10 are not affected during the entire firmware upgrade process.

In conclusion, the system capable of upgrading a firmware in background and the method for upgrading the firmware in background provided by the present disclosure can divide the memory module of an electronic device, one user code sector is used to normally perform firmware and upgrade processes, and the other user code sector is used to store the upgrade firmware to avoid affecting the initial firmware when writing to the memory module during the upgrade process. In addition, it is not necessary to suspend various operations of the electronic device during the upgrade process, and the upgrade can be completed during the normal operation of the electronic device.

Furthermore, during the upgrade process, reliability of the firmware upgrade data is checked, and during implementations of the above processes, as long as the memory module works normally, even if the firmware upgrade fails, the electronic device will still work properly.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for upgrading a firmware in background applicable to an electronic device including a processing unit and a memory module, the method comprising:
    configuring the processing unit of the electronic device to execute a boot process, wherein the memory module includes a boot sector, a first user code sector, a second user code sector, and a flag sector, the boot sector stores the boot process, each of the first user code sector and the second user code sector stores an initial firmware, and the flag sector stores a plurality of upgrade auxiliary variables, and the boot process includes:
        importing the initial firmware into the boot sector;
        determining the first user code sector and the second user code sector as a firmware operating sector and a firmware backup sector, respectively, according to an execution priority of the plurality of upgrade auxiliary variables; and
        selecting the initial firmware of the firmware operating sector to execute a firmware main process;
    configuring a host connected to the electronic device to execute an upgrade process associated with an upgrade firmware, wherein the firmware main process and the upgrade process are cooperated to perform an upgrade flow, which includes:
        configuring the host to obtain a firmware version of the initial firmware from the electronic device, and determining whether the firmware version is smaller than a version of the upgrade firmware;
        configuring the host to, in response to the firmware version being less than the version of the upgrade firmware, send a background firmware upgrade request to the electronic device;
        configuring the processing unit to return an upgrade request result according to an operation state of the electronic device, wherein the upgrade request result is used to indicate that the electronic device is in an idle state or a busy state;
        configuring the processing unit to, in response to the upgrade request result indicating that the electronic device is in the idle state, determine whether or not the electronic device is in a system idle state;
        configuring the processing unit to, in response to the processing unit determining that the electronic device is in the system idle state, detect the execution priority to determine how the first user code sector and the second user code sector are allocated to the firmware operating sector and the firmware backup sector, and set the firmware backup sector as a current upgrade sector;
        configuring the host to send a firmware data write request to the electronic device to configure the processing unit to perform an erasing operation on the current upgrade sector and write data of the upgrade firmware into the current upgrade sector; and
        configuring the processing unit to, in response to the data of the upgrade firmware being written, return an operation result indicating a successful upgrade operation;
    in response to the electronic device being restarted, configuring the processing unit to execute the boot process to determine which of the first user code sector and the second user code sector has been upgraded, and modify the execution priority accordingly; and
    configuring the processing unit to execute another firmware main process by selecting the upgraded initial firmware in the firmware operating sector according to the modified execution priority.

2. The method according to claim 1, wherein the host obtains the upgrade request result through a transmission interface of the electronic device, and the upgrade flow further includes:
    configuring the host to send a current firmware version acquire request to the electronic device through the transmission interface;
    configuring the processing unit to return the firmware version of the initial firmware;
    configuring the host to determine whether the firmware version is smaller than a version of the upgrade firmware; and
    configuring the host to, in response to the firmware version being less than the version of the upgrade firmware, send the background firmware upgrade request to the electronic device through the transmission interface.

3. The method according to claim 1, wherein the upgrade flow further includes:
    configuring the processing unit to, in response to the upgrade request result indicating that the electronic device is in the idle state, detect a system state flag in the upgrade auxiliary variables to determine whether the electronic device is in the system idle state; and
    configuring the processing unit to, in response to the system state flag indicating that the electronic device is in the system idle state, to enable a background firmware upgrade function.

4. The method according to claim 3, wherein the system state flag includes a plurality of sub-state flags corresponding to a plurality of function instruction pointers (IP), and wherein, after the sub-state flags indicate that the plurality of function instruction pointers are idle, the system status flag then indicates that the electronic device is in the system idle state.

5. The method according to claim 1, wherein the upgrade flow further includes:
    configuring the processing unit to, in response to the processing unit setting the firmware backup sector as the current upgrade sector, accordingly modify an upgrade start flag of the upgrade auxiliary variables corresponding to a user flag sector of the firmware backup sector as indicating an upgrade start state.

6. The method according to claim 5, wherein the upgrade flow further includes:
   in response to the data of the upgrade firmware being written, configuring the host to send an end background upgrade request to the electronic device; and
   in response to the electronic device receiving the end background upgrade request, configuring the processing unit to detect whether the background firmware upgrade function is enabled, and if so, configuring the processing unit to modify an upgrade completion flag of the upgrade auxiliary variables corresponding to the user flag sector of the firmware backup sector as indicating an upgrade completion state, and return the operation result to the host.

7. The method according to claim 1, wherein the upgrade firmware is stored in the host, and the upgrade firmware includes a cyclic redundancy check (CRC) value.

8. The method according to claim 7, wherein the upgrade flow further includes:
   in response to the electronic device receiving the firmware data write request, configuring the processing unit to further determine whether the current upgrade sector has the erasing operation performed thereon before configuring the processing unit to perform the erasing operation on the current upgrade sector; and
   in response to the processing unit determining that the erasing operation has been performed on the current upgrade sector, configuring the processing unit to directly write the data of the upgrade firmware into the current upgrade sector.

9. The method according to claim 7, wherein the upgrade flow further includes:
   configuring the host to divide the data of the upgrade firmware into multiple records of data to be attached to the firmware data write request, and send the firmware data write request to the electronic device for multiple times.

10. The method according to claim 1, wherein the flag sector further includes a first user flag sector and a second user flag sector that store the upgrade auxiliary variables corresponding to the first user code sector and the second user code sector, respectively.

11. A system capable of upgrading a firmware in background, comprising:
   an electronic device, including:
      a processing unit; and
      a memory module, including:
         a boot sector storing a boot process;
         a first user code sector and a second user code sector, each storing an initial firmware; and
         a flag sector storing a plurality of upgrade auxiliary variables; and
   a host configured to execute an upgrade process associated with an upgrade firmware, wherein the processing unit is configured to execute the boot process, which includes:
      importing the initial firmware into the boot sector;
      determining the first user code sector and the second user code sector as a firmware operating sector and a firmware backup sector, respectively, according to an execution priority of the plurality of upgrade auxiliary variables; and
      selecting the initial firmware of the firmware operating sector to execute a firmware main process;
   wherein the firmware main process and the upgrade process are cooperated to perform an upgrade flow, which includes:
      configuring the host to obtain a firmware version of the initial firmware from the electronic device, and determine whether the firmware version is smaller than a version of the upgrade firmware;
      configuring the host to, in response to the firmware version being less than the version of the upgrade firmware, send a background firmware upgrade request to the electronic device;
      configuring the processing unit to return an upgrade request result according to an operation state of the electronic device, wherein the upgrade request result is used to indicate that the electronic device is in an idle state or a busy state;
      configuring the processing unit to, in response to the upgrade request result indicating that the electronic device is in the idle state, determine whether the electronic device is in a system idle state;
      configuring the processing unit to, in response to the processing unit determining that the electronic device is in the system idle state, detect the execution priority to determine how the first user code sector and the second user code sector are allocated to the firmware operating sector and the firmware backup sector, and set the firmware backup sector as a current upgrade sector;
      configuring the host to send a firmware data write request to the electronic device to configure the processing unit to perform an erasing operation on the current upgrade sector and write data of the upgrade firmware into the current upgrade sector; and
      configuring the processing unit to, in response to the data of the upgrade firmware being written, return an operation result indicating a successful upgrade operation;
   wherein, in response to the electronic device being restarted, the processing unit is configured to execute the boot process to determine which of the first user code sector and the second user code sector has been upgraded, and modify the execution priority accordingly; and
   wherein the processing unit is configured to execute another firmware main process by selecting the upgraded initial firmware in the firmware operating sector according to the modified execution priority.

12. The system according to claim 11, wherein the host is configured to obtain the upgrade request result through a transmission interface of the electronic device, and the upgrade flow further includes:
   configuring the host to send a current firmware version acquire request to the electronic device through the transmission interface;
   configuring the processing unit to return the firmware version of the initial firmware;
   configuring the host to determine whether the firmware version is smaller than a version of the upgrade firmware; and
   configuring the host to, in response to the firmware version being less than the version of the upgrade firmware, send the background firmware upgrade request to the electronic device through the transmission interface.

13. The system in background according to claim 11, wherein the upgrade flow further includes:
   configuring the processing unit to, in response to the upgrade request result indicating that the electronic device is in the idle state, detect a system state flag in the upgrade auxiliary variables to determine whether the electronic device is in the system idle state; and configuring the processing unit to, in response to the system state flag indicating that the electronic device is in the system idle state, to enable a background firmware upgrade function.

14. The system in background according to claim 13, wherein the system state flag includes a plurality of sub-state flags corresponding to a plurality of function instruction pointers (IP), and wherein, after the sub-state flags indicate that the plurality of function instruction pointers are idle, the system status flag then indicates that the electronic device is in the system idle state.

15. The system in background according to claim 11, wherein the upgrade flow further includes:

configuring the processing unit to, in response to the processing unit setting the firmware backup sector as the current upgrade sector, accordingly modify an upgrade start flag of the upgrade auxiliary variables corresponding to a user flag sector of the firmware backup sector as indicating an upgrade start state.

16. The system in background according to claim 15, wherein the upgrade flow further includes:

in response to the data of the upgrade firmware being written, configuring the host to send an end background upgrade request to the electronic device; and in response to receiving the end background upgrade request, configuring the processing unit to detect whether the background firmware upgrade function is enabled, and if so, configuring the processing unit to modify an upgrade completion flag of the upgrade auxiliary variables corresponding to the user flag sector of the firmware backup sector as indicating an upgrade completion state, and return the operation result to the host.

17. The system in background according to claim 11, wherein the upgrade firmware is stored in the host, and the upgrade firmware includes a cyclic redundancy check (CRC) value.

18. The system in background according to claim 17, wherein the upgrade flow further includes:

in response to the electronic device receiving the firmware data write request, configuring the processing unit to further determine whether the current upgrade sector has the erasing operation performed thereon before configuring the processing unit to perform the erasing operation on the current upgrade sector; and in response to the processing unit determining that the erasing operation has been performed on the current upgrade sector, configuring the processing unit to directly write the data of the upgrade firmware into the current upgrade sector.

19. The system in background according to claim 17, wherein the upgrade flow further includes:

configuring the host to divide the data of the upgrade firmware into multiple records of data to be attached to the firmware data write request, and send the firmware data write request to the electronic device for multiple times.

20. The system in background according to claim 11, wherein the flag sector further includes a first user flag sector and a second user flag sector, respectively storing the upgrade auxiliary variables corresponding to the first user code sector and the second user code sector.

* * * * *